(12) United States Patent
Pecori et al.

(10) Patent No.: US 10,497,502 B2
(45) Date of Patent: Dec. 3, 2019

(54) SOLENOID-VALVE CONTROL SYSTEM

(71) Applicant: C.R.F. Societa Consortile per Azioni, Orbassano (Turin) (IT)

(72) Inventors: Andrea Pecori, Orbassano (IT); Emanuele Pisano, Orbassano (IT); Mitzi Puccio, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 515 days.

(21) Appl. No.: 15/341,066

(22) Filed: Nov. 2, 2016

(65) Prior Publication Data
US 2017/0125145 A1    May 4, 2017

(30) Foreign Application Priority Data

Nov. 3, 2015  (EP) ..................................... 15192798

(51) Int. Cl.
*H01H 47/00* (2006.01)
*H01F 7/06* (2006.01)
*F16K 31/06* (2006.01)
*H01F 7/08* (2006.01)
*F02D 41/20* (2006.01)

(52) U.S. Cl.
CPC ............. *H01F 7/064* (2013.01); *F02D 41/20* (2013.01); *F16K 31/0675* (2013.01); *H01F 7/081* (2013.01); *F02D 2041/2037* (2013.01); *F02D 2041/2044* (2013.01)

(58) Field of Classification Search
None
See application file for complete search history.

(56) References Cited

U.S. PATENT DOCUMENTS 5,173,178 A * 12/1992 Kawashima .............. E03C 1/04
137/801
2005/0146408 A1   7/2005 Traversa et al.

FOREIGN PATENT DOCUMENTS

| DE | 102006043677 A1 | 6/2007 |
| DE | 102007060771 A1 | 6/2009 |
| DE | 102008006706 A1 | 8/2009 |
| DE | 102009045581 A1 | 4/2011 |
| EP | 1533506 A2 | 5/2005 |

OTHER PUBLICATIONS

European Search Report dated Apr. 29, 2016 for EP Application 15192798.5, 3 pages.

* cited by examiner

*Primary Examiner* — Stephen W Jackson
(74) *Attorney, Agent, or Firm* — RMCK Law Group PLC

(57) ABSTRACT

Described herein is a system for controlling a solenoid valve, which includes a driving circuit for driving a solenoid of the solenoid valve and a control unit for controlling the driving circuit. The control unit is configured for generating in the solenoid, during operation of the solenoid valve: first current signal for moving the open/close element from a first position to a second position, which is generated by the external supply network, to which the solenoid is connected; and second current signal, which is generated exclusively as a result of residual magnetism in the magnetic element of the solenoid valve and is activated when the open/close element is still in the aforesaid second position.

12 Claims, 5 Drawing Sheets

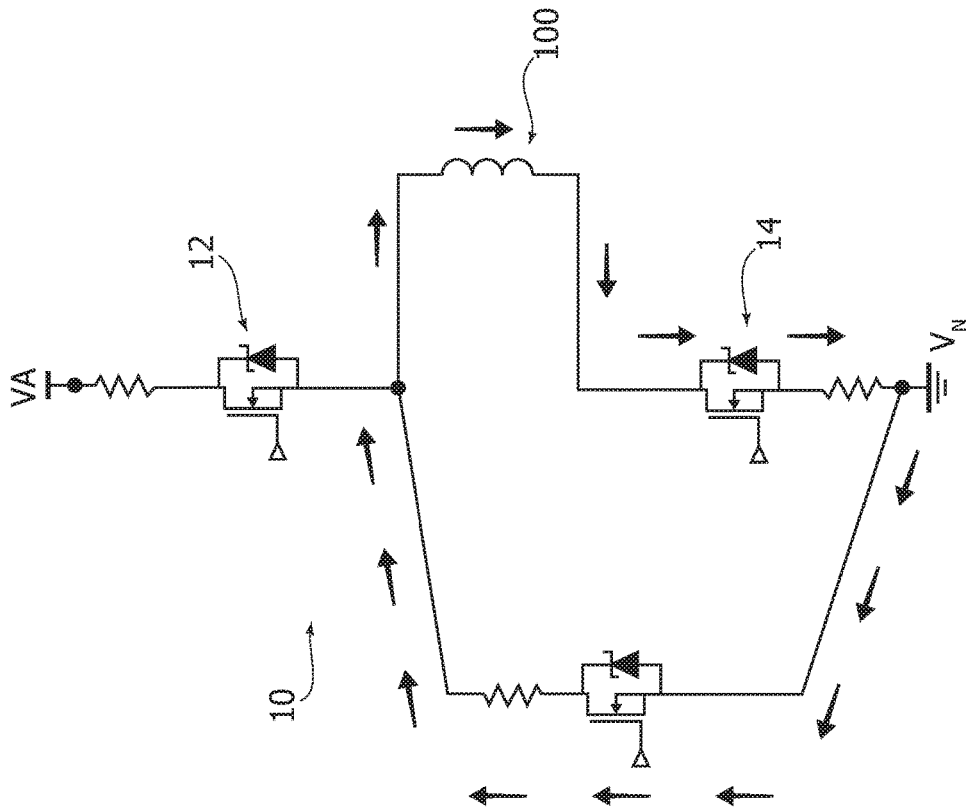
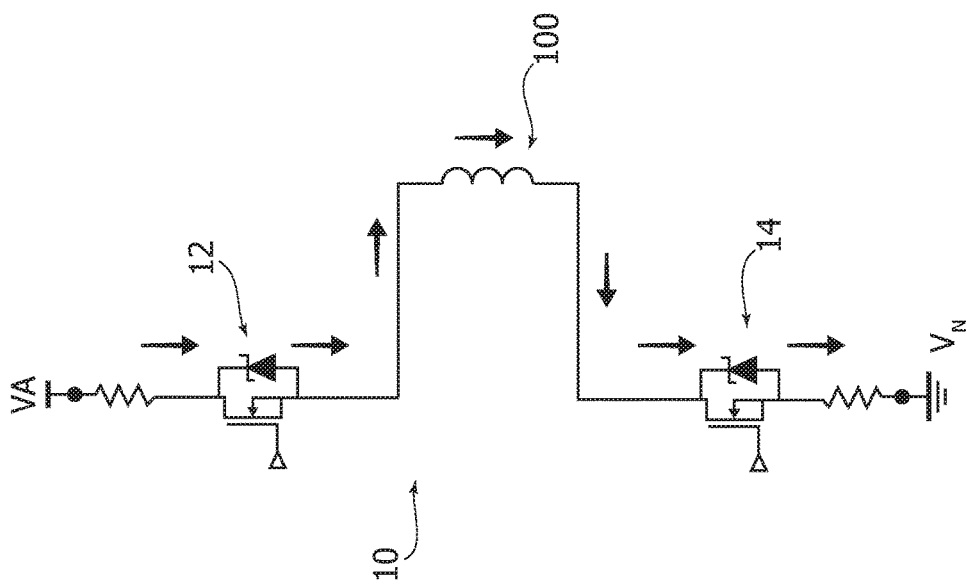

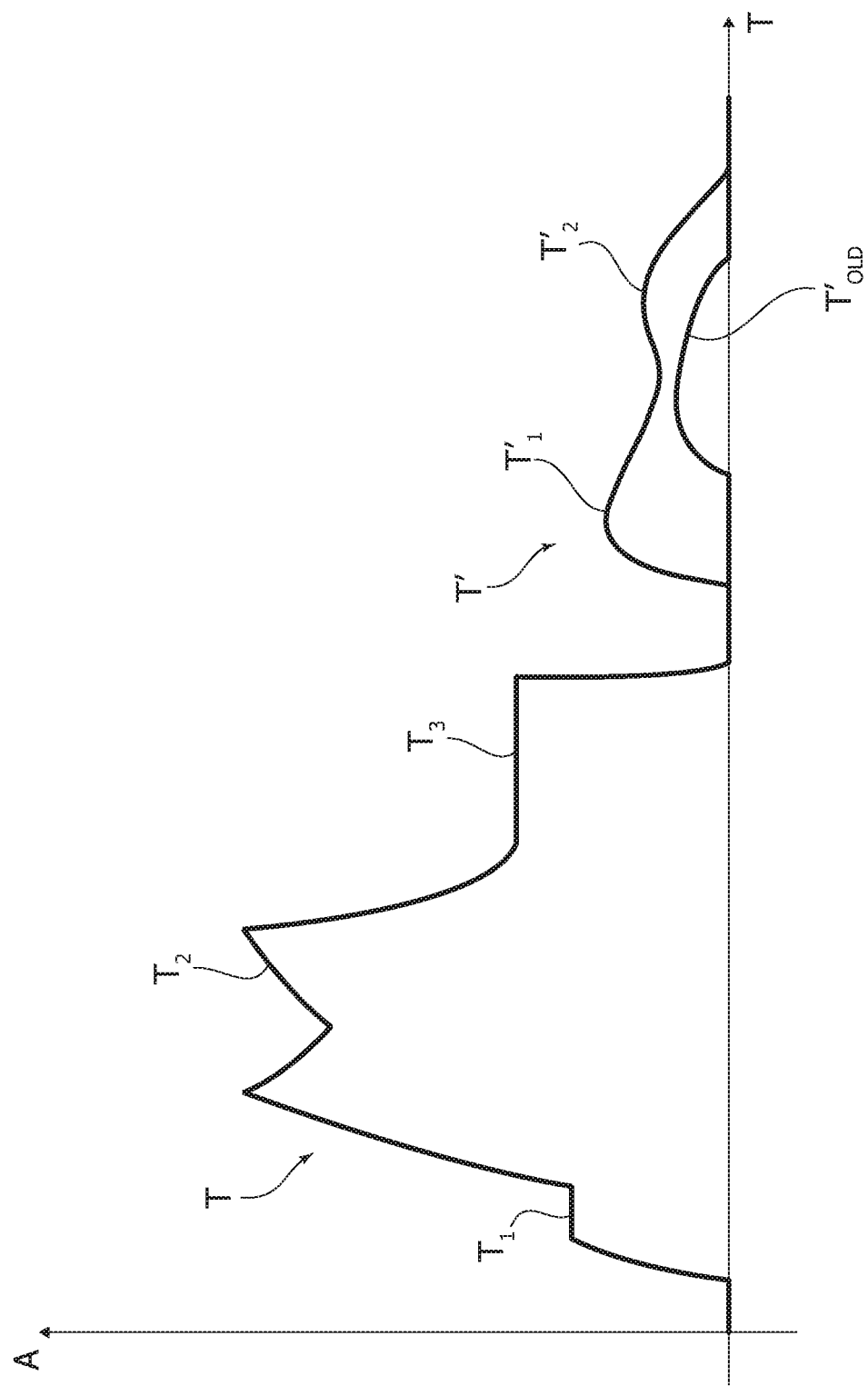

SOLENOID-VALVE CONTROL SYSTEM

CROSS REFERENCE TO RELATED APPLICATIONS

This application claims priority to European Patent Application No. 15192798.5 filed on Nov. 3, 2015, the entire disclosure of which is incorporated herein by reference.

FIELD OF THE INVENTION

The present invention relates, in general, to a system for controlling a solenoid valve and to the corresponding method for controlling the valve.

PRIOR ART

As is in itself known in the art, a solenoid valve comprises, in general:
 a solenoid;
 a magnetic element associated to the solenoid and mobile as a result of electromagnetic interaction with the aforesaid solenoid; and
 an open/close element mobile between two positions: a first position, in which it obstructs the passage for the fluid to which the open/close element is associated, and a second position, in which the passage is instead open and the fluid can traverse it.

The open/close element is driven into one of the two positions by a spring and can be moved from this position to the other position by the magnetic element.

In so-called normally open valves, the position for opening the passage is governed by the spring, and the corresponding closing position is instead governed by the solenoid by way of the magnetic element. Instead, in so-called normally closed valves, the closing position is governed by the spring, and the opening position by the solenoid.

Use of the aforesaid valves is above all widespread in applications in which a relatively high operating speed of the valve is required. Solenoid valves are commonly used, for example, in fuel-injection systems of internal-combustion engines, or else in some of the systems for variable actuation of the engine valves, such as, for example, the UNIAIR system developed by the present applicant. As may be clearly understood, in these applications the solenoid valve may even be driven up to one hundred times per second.

A problem much felt in these applications is represented by the possibility of controlling precisely the times in which the open/close element sets itself in the two end-of-travel positions indicated. In this connection, two patent applications may here be cited, the documents Nos. EP 1533506 A2 and EP 2072791 A1, filed in the name of the present applicant. The patent application No. EP 1533506 A2 regards a method for determining the instant of end-of-travel of the open/close element during the phase of de-excitation of the solenoid. The patent application No. EP 2072791 A1 regards, instead, a method for determining the instant of end-of-travel of the open/close element during the phase of excitation of the solenoid. It should be noted that in the present description by "end-of-travel position" of the phase of excitation of the solenoid is meant the end-of-travel position reached by the open/close element as a result of the electromagnetic forces acting on the mobile magnetic element of the valve, which are generated by the solenoid when it is supplied by an external electrical supply network. By "end-of-travel position" of the phase of de-excitation of the solenoid is meant, instead, the end-of-travel position reached by the open/close element as a result of the action of the spring.

With specific reference, now, to the phase of de-excitation of the solenoid, it should be considered that, in this phase, the open/close element is subjected to an action of a prevalently impulsive type by the spring, which triggers as soon as the elastic force exerted thereby exceeds the magnetic force acting on the magnetic element. The elastic force of the spring determines an oscillatory dynamics of the open/close element and/or of the magnetic element associated thereto, which requires a given lapse of time before being definitively damped.

The German patent application No. DE 10 2006043677 A1 tackles the above problem with a solution that envisages driving the solenoid during the de-excitation phase with a current having the function of braking the movement of return of the open/close element so as to limit the number and degree of its oscillations before stably reaching this position.

OBJECT OF THE INVENTION

The object of the present invention is to improve the known solutions referred to, in particular from the standpoint of controlling the open/close element in the phase of de-excitation of the solenoid.

SUMMARY OF THE INVENTION

The object referred to above is achieved via a control system having the characteristics specified in claim 1. The present invention moreover regards a control method according to claim 10.

The claims form an integral part of the technical teaching provided herein in relation to the invention.

The present invention starts from the solution described in the patent application No. EP 1 533 506 A2 referred to above, filed in the name of the present applicant. As has been seen above, the solution in question regards a method for determining the instant of end-of-travel of the open/close element during the phase of de-excitation of the solenoid. This solution envisages provision of a driving circuit for driving the solenoid, which, under appropriate command, makes it possible to obtain in the solenoid a current signal generated as a result of the residual magnetism in the magnetic element. The method in question envisages analysis of this current signal and identification of the instant at which it assumes a given pattern that points to the fact that the open/close element has reached the end-of-travel position.

The present applicant has now understood that it is possible to use a current signal of a similar type, with the dual purpose of controlling the movement of return of the open/close element during the de-excitation phase in question and of determining the instant at which the open/close element reaches the corresponding end-of-travel position.

As will be seen in what follows, the signal in question is always generated exclusively as a result of the residual magnetism in the magnetic element, after the electrical connection of the solenoid with the external supply network has been interrupted, but in this case it is activated when the open/close element is still in the end-of-travel position of the phase of excitation of the solenoid.

The signal thus obtained is such as to induce a magnetic force that is able to exert a resistant action in regard to the movement of the open/close element. As a result of this action, the movement of the open/close element is hence controlled throughout its travel. At the same time, the current signal in question, if left active at least until the open/close element reaches the end-of-travel position, can be used for determining that this position has been reached, according to the teachings furnished in the patent application No. EP 1533506 A2.

DETAILED DESCRIPTION OF SOME EMBODIMENTS

Further characteristics and advantages of the invention will emerge clearly from the ensuing description with reference to the annexed drawings, which are provided purely by way of non-limiting example and in which:

FIGS. 3A and 3B illustrate the system of FIG. 2 in two different states;

Figure 5:

FIG. 4 is a diagram representing the current signal generated in the known solution referred to above and the current signal generated according to an embodiment of the present invention; and FIG. 5 represents, with reference to an application in which the valve is associated to a hydraulic system of the lost-motion type for variable actuation of the engine valves, a diagram, which shows, from top down, the plots of the pressure of fluid within the high-pressure chamber controlled by the valve, of the lift of the engine valve, and of the current generated in the solenoid, to enable a comparison between the valve control mode according to the teachings of the document No. EP 1533506 A2 and the control mode according to the teachings provided herein.

Illustrated in the ensuing description are various specific details aimed at providing an in-depth understanding of the embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

Figure 1:
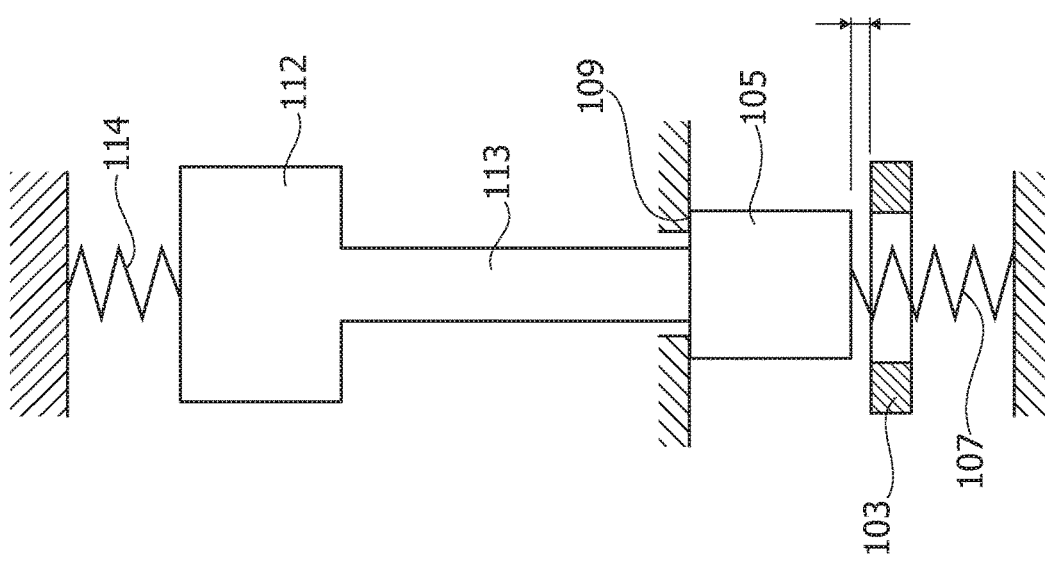
FIG. 1 illustrates an example of solenoid valve.

FIG. 1 is a schematic representation of an example of solenoid valve. This comprises an open/close element 105 mobile between a first end-of-travel position, in which it bears upon a valve seat 103 and closes the passage provided therein, and a second end-of-travel position, in which it bears upon a contrast surface 109 positioned on the opposite side of the open/close element with respect to the valve seat and in which the passage is instead open.

The valve comprises a spring 107 designed to push the open/close element against the surface 109. On the opposite side of the open/close element, the valve comprises a pusher element 113 carried by the magnetic core 112. The latter is in turn engaged by a spring 114 that exerts thereon an action of thrust in a direction opposite to the action exerted by the spring 107 on the open/close element 105.

A solenoid (not illustrated) is positioned around the magnetic core 112 and is prearranged for moving the core, and consequently the pusher element 113 associated thereto, in the direction that enables the pusher element 113 to push the open/close element 105 from the position where it bears upon the surface 109 to the opposite position, where it bears upon the valve seat 103. When the solenoid is de-excited, the spring 107 again pushes the open/close element against the surface 109. The pusher element 113 and the magnetic core 112 continue, instead, to move as a result of their kinetic energy, but are eventually brought back against the open/close element 105 under the action exerted by the spring 114.

As mentioned at the start, by way of the oscillations induced by the springs 114 and 107 there exists a settling time before the pusher element 113 moves into the end-of-travel position referred to.

With reference, now, to the control system described herein, this has the function of controlling a solenoid valve, for example a solenoid valve of the type just described, which is illustrated in FIG. 1.

As will be seen in what follows, the system described herein is characterized in that it envisages a particular control of the movement of return of the open/close element during the phase of de-excitation of the solenoid.

Figure 2:
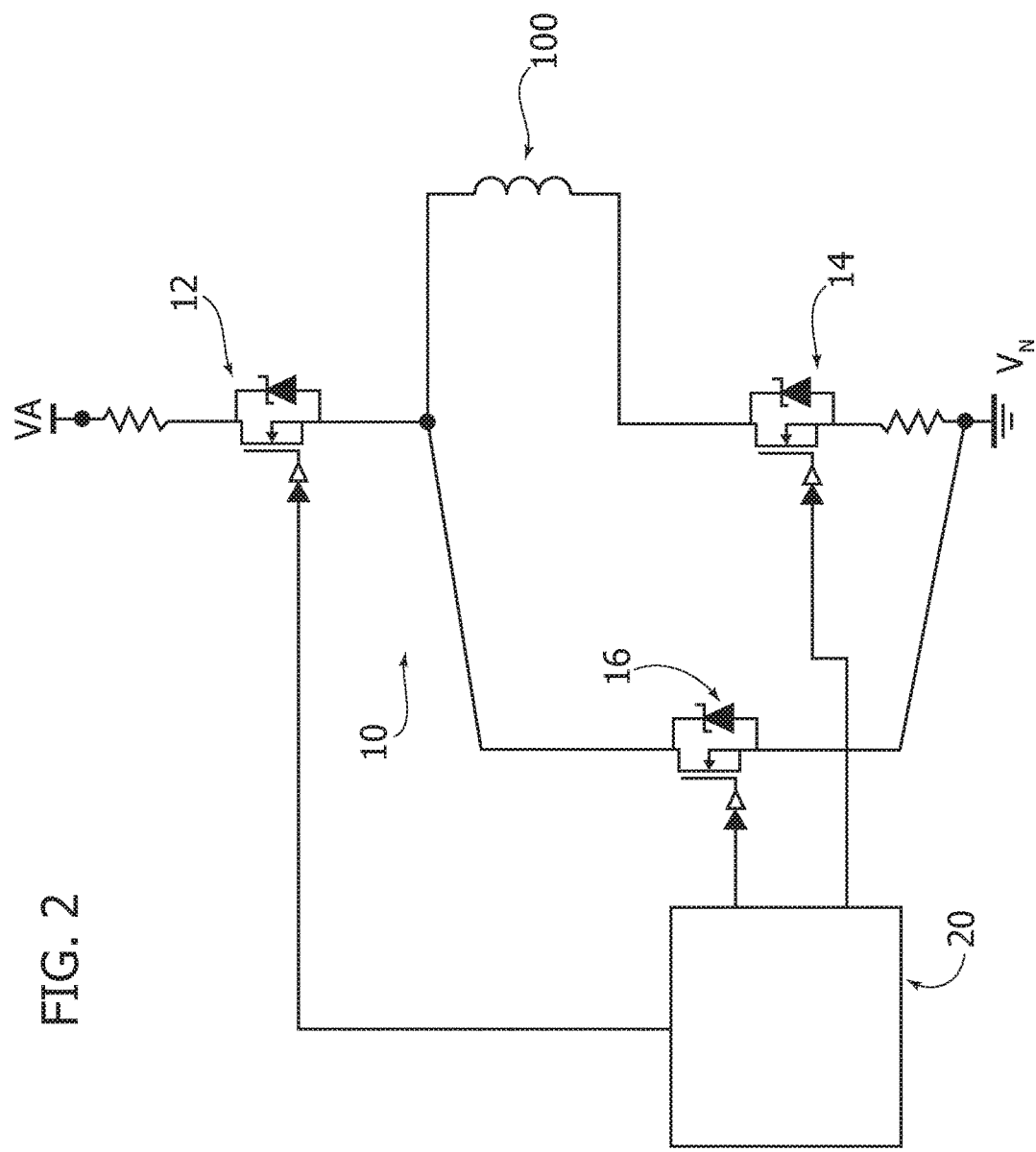
FIG. 2 illustrates an embodiment of the control system described herein.

Illustrated schematically in FIG. 2 is an embodiment of the system described herein.

In general, this system comprises a driving circuit 10, which is connected to an external supply network between a supply node VA and a ground node VM, and connects a solenoid 100 of a solenoid valve. A control unit 20 is configured for controlling the driving circuit 10.

As will become evident in what follows, the driving circuit may present different configurations. In the embodiment illustrated in FIG. 2, this circuit comprises a first MOSFET 12 designed to control passage of current between the supply node VA and the solenoid 100, and a second MOSFET 14 designed to control, instead, passage of current between the solenoid 100 and the ground node VM. A third MOSFET 16 enables re-circulation of the residual current towards the ground node VM; this is in particular driven in perfect opposition with respect to the transistor 12.

To operate the mobile element of the valve that is operatively associated to the solenoid 100, for example the pusher element 113 in the case of the valve illustrated in FIG. 1, the control unit 20 drives, via appropriate guide signals, the transistors 12 and 14 so that the supply voltage of the external network generates in the solenoid a current signal that is able to activate movement of the mobile magnetic element as a result of the electromagnetic force induced by this current. FIG. 3A illustrates this first condition of operation of the system.

Illustrated in FIG. 4 is an example of the plot of the current generated in the solenoid during an entire cycle of activation of the solenoid valve. The phase of excitation of the solenoid determines a current signal T that is characterized in that it defines three different current levels T1, T2, and T3. The first level T1 corresponds to an initial phase in which magnetization of the mobile element is obtained. The next level T2 corresponds to the phase of displacement of the mobile element. The third level T3 corresponds, instead, to the phase in which the mobile element is held in position, after it has reached the end-of-travel position. As is known in the art, the three current levels are obtained by alternating in rapid succession time intervals (of the order of microseconds) in which the solenoid is supplied by the external supply network and time intervals in which the supply is, instead, interrupted.

To start the subsequent phase of de-excitation of the solenoid—with reference to FIG. 4—a phase that starts at the substantially vertical falling stretch immediately after the third level T3—the control unit 20 drives the transistors 12 and 14 so that these interrupt the passage of current respectively from the supply node VA to the solenoid and from the solenoid to the ground node VM, thus setting to zero the current passing through it (see in this connection FIG. 4).

In the absence of any action, the residual magnetic field in the magnetic element of the solenoid valve would vanish rapidly and after a few instants the elastic force of the spring would by itself drive movement of the open/close element into the end-of-travel position of the de-excitation phase in question, giving rise to the oscillatory dynamics referred to at the start.

Now, in the system described herein the control unit 20 is configured for generating in the solenoid a second current signal T' during the phase of de-excitation of the solenoid valve. FIG. 4 illustrates an example of the profile of this second signal.

The signal in question is generated exclusively by the residual magnetism in the magnetic element, in a condition of operation of the solenoid valve in which the solenoid is no longer supplied by the external supply network, and is characterized in that it is activated starting from when the open/close element of the solenoid valve is still in the end-of-travel position of the phase of excitation of the solenoid.

As anticipated above, this current signal first of all has the function of inducing an electromagnetic force on the mobile element that is such as to exert an action countering the action exerted by the spring in bringing back the open/close element into the end-of-travel position of the de-excitation phase. Since then this signal is activated when the open/close element is still in the end-of-travel position of the excitation phase, its countering action causes the mobile element and the open/close element to be in some way withheld, and the impulsive action exerted on these by the spring cannot have its full effect on them, not even in the initial phases of their movement of return so that their movement is constantly controlled, right from the start.

Preferably, as may be seen in FIG. 4, the current signal in question is temporally separated from the current signal T precisely by the phase of excitation of the solenoid valve, but must in any case be sufficiently close to the latter for it to be activated when the open/close element is still in the end-of-travel position of the excitation phase, not having yet moved therefrom after the end of the latter phase. With respect to the current signal T"s functions, the Applicant has verified that best performances are obtained if this signal T' has already reached at least a level equal to 40% of the current signal T3 before the open/close element starts moving from the end-of-travel position of the excitation phase, back towards the end-of-travel position of the de-excitation phase.

Such a level of current has in fact been shown to induce an effective electromagnetic force that withholds the mobile element and limits its acceleration substantially, since from the beginning of its back movement towards the end position of the de-excitation phase.

With reference to the system illustrated in FIG. 2, for generating this signal, the control unit 20 drives the transistor 12 so as to interrupt passage of current between the supply node VA and the solenoid 100, and at the same time drives the transistor 14 to enable, instead, passage of current between the solenoid 100 and the ground node VM. FIG. 3B illustrates this condition of operation of the system.

The instant at which this signal is to be activated by the control unit may be identified during a step of calibration of operation of the solenoid valve, seeking the time that needs to elapse between the instant at which the driving circuit interrupts supply to the solenoid by the external supply network and the instant at which it activates the signal in question such as to enable, on the one hand, the current signal of the phase of excitation of the solenoid valve to vanish completely and, on the other, the new signal to be generated when the open/close element is still in the end-of-travel position of the excitation phase. In preferred embodiments, the time in question must in any case be short enough to enable the current signal T' to reach at least a level equal to 40% of the current signal T3, before the open/close element moves from the end-of-travel position of the excitation phase. In some embodiments, this time might even be zero, so that no actual interruption of the current signal is effected.

The time interval thus determined—obviously taking into account also the delays due to the electrical dynamics of the system—can then be recorded in the control unit in order to dictate the times at which this must intervene.

With reference to the driving circuit illustrated in FIG. 2, the control unit is hence prearranged for restoring passage of current between the solenoid 100 and the ground node VM after the aforesaid pre-set time interval has elapsed from the previous instant when the unit had interrupted passage of current between the solenoid and the nodes VA and VM.

The controlled movement, referred to above, of the open/close element and of the mobile magnetic element, which is induced by the current signal T', has first of all the effect of limiting the pressure-drop rate in the fluid controlled during the de-excitation phase, and, in the second place, of reducing the degree of the impact to which the open/close element and the magnetic element are subjected as they return into their respective end-of-travel positions.

FIG. 5 illustrates a comparison between the control mode implemented according to the teachings of the document No. EP 1533506 A2 and the mode described herein in the framework of an application in which the solenoid valve is associated to a hydraulic system of a lost-motion type for variable actuation of the engine valves, in particular for actuation of the intake valves.

The comparison of the pressures in the solenoid valve and of the lift of the engine valve, illustrated in FIG. 5, clearly shows how, in the control mode described herein, the pressure and the engine-valve lift decrease less steeply. It should be noted, instead, that the current signals represented in this figure correspond exactly to the signals T3, T', and Told illustrated in FIG. 4. In FIG. 5, the current signal T' of the control mode according to the invention is not shifted from the signal T3 only for reasons of resolution of representation, given that the distance in time between the two signals is of the order of microseconds.

The effects indicated above both contribute to achieving a considerable reduction of the vibrations generated in the engine valve, in addition to the pressure oscillations in the hydraulic part, with consequent reduction of engine noise, as the present applicant has been able to note by conducting various NVH (Noise, Vibration, and Harshness) tests. The applicant has verified that it is particularly the mentioned reduction of the pressure-drop rate in the hydraulic system actuating the engine valves, that leads to a dramatic improvement of the engine's features relating to NVH. It should now be noted that, according to a preferred embodiment, the control unit is configured for maintaining active this signal at least until the open/close element has reached its end-of-travel position. By so doing, this signal can be at the same time used for determining when the open/close element has reached this position thanks to the characteristic pattern that it assumes at this event.

In this connection, it may be seen from FIG. 4 how the signal in question, after the peak T1' corresponding to the maximum level of current that can be generated as a result of the residual magnetism in the mobile element, has a second peak T2', which is generated precisely at the instant when the open/close element has reached the end-of-travel position in question.

This behaviour of the signal has already been described in the patent application No. EP 1533506 A2, filed in the name of the present applicant and this, in particular, presents a specific algorithm that can be used by the system for recognising start of this behaviour and thus determining the instant at which the open/close element reaches its end-of-travel position. In FIG. 4, the line $T'_{old}$ represents the current signal generated in the known solution in question.

It is worth noting that the current signal represented in FIG. 5 slightly differs from the one of FIG. 4, particularly, in that the former has one peak only, instead of the two peaks of the latter. This difference in shape simply derives from the different times the respective current signals are activated after the interruption of power supply to the solenoid, and, precisely, the signal of FIG. 4 is activated at an earlier time than the signal of FIG. 5.

In view of the above, the system described herein hence affords the possibility of obtaining a controlled movement of return of the open/close element during the phase of de-excitation of the solenoid, and at the same time of determining the instant at which this movement is terminated.

In the light of the foregoing, there now clearly emerge the advantages deriving from the system described herein, in terms of stability of the fluid-dynamic and mechanical behaviour of the solenoid valve and at the same time in terms of precision and repeatability of the control exerted thereon.

Of course, without prejudice to the principle of the invention, the details of construction and the embodiments may vary, even significantly, with respect to what has been illustrated herein purely by way of non-limiting example, without thereby departing from the scope of the invention, as defined in the annexed claims. For example, the driving circuit of the system may have, instead of the MOSFETs illustrated, other types of electronic switches that can be controlled via control signals, such as for example bipolar transistors or transistors of some other type.

What is claimed is:

1. A control system for a solenoid valve, wherein said solenoid valve comprises:
    a solenoid;
    a magnetic element associated to said solenoid and mobile as a result of an electromagnetic interaction with said solenoid; and
    an open/close element mobile between a first position and a second position, wherein said open/close element is driven into said first position by a spring and is configured to be moved by said magnetic element from said first position to said second position,
    said control system comprising:
    a circuit for driving said solenoid, wherein said circuit is connected to an external supply network between a supply node and a ground node; and
    a control unit configured for controlling said circuit, wherein said control unit is configured for controlling said circuit in such a way that in operation of said solenoid valve:
    a first current signal is generated in said solenoid for moving said open/close element from said first position to said second position, said first current signal being generated by said external supply network; and
    a second current signal is generated in said solenoid exclusively as a result of residual magnetism in said magnetic element;
    wherein said control unit is configured for controlling said circuit in such a way that said second current signal is activated when said open/close element is still in said second position; and
    wherein said control unit is configured for controlling said circuit in such a way that:
    said first current signal, after reaching a first current level for moving said open/close element from said first position to said second position, does maintain a second current level for holding said open/close element in said second position, and
    said second current signal has reached at least a level equal to 40% of said second current level before said open/close element starts moving from said second position towards said first position.

2. The system according to claim 1, wherein said control unit is configured for controlling said circuit in such a way that said second current signal is maintained at least until said open/close element has reached said first position.

3. The system according to claim 1, wherein said control unit is configured for controlling said circuit in such a way that said second current signal is generated after a pre-set time interval has elapsed from an end of said first signal.

4. The system according to claim 1, wherein said circuit comprises a first switch, which is connected to said solenoid and is configured to be driven via said control unit into a first condition where passage of current from said solenoid to said ground node is enabled and a second condition where said passage of current from said solenoid to said ground node is interrupted.

5. The system according to claim 4, wherein said circuit comprises a second switch, which is connected to said solenoid and is configured to be driven via said control unit into a first condition where passage of current from said supply node to said solenoid is enabled and a second condition where said passage of current from said supply node to said solenoid is interrupted.

6. The system according to claim 5, wherein:
    said control unit is configured for driving said first and second switches into their respective first conditions, for generating said first current signal in said solenoid; and
    wherein:
    said control unit is configured for driving said first switch into said first condition and said second switch into said second condition, for generating said second current signal in said solenoid.

7. The system according to claim 6, wherein:
    said control unit is configured for sending a control signal to said first and second switches for these to assume their respective first conditions,
    wherein said control unit is configured for sending said control signal simultaneously to said first switch and to said second switch so as to generate said first current signal, and
    wherein said control unit is configured for interrupting subsequently sending of said signal to both of said first and second switches and, after a pre-set time, for sending again said signal only to said first switch so as to generate said second current signal.

8. The system according to claim 7, wherein said pre-set time is equal or less than 200 μs.

9. A method for controlling a solenoid valve, wherein said solenoid valve comprises:

a solenoid;
a magnetic element associated to said solenoid and mobile as a result of an electromagnetic interaction with said solenoid; and
an open/close element mobile between a first position and a second position, wherein said open/close element is driven into said first position by a spring and is configured to be moved by said magnetic element from said first position to said second position,
said method being implemented via a control system comprising:
a circuit for driving said solenoid, wherein said circuit is connected to an external supply network between a supply node and a ground node; and
a control unit configured for controlling said circuit, wherein said method includes the following steps:
generating in said solenoid a first current signal for moving said open/close element from said first position to said second position, said first current signal being generated by said external supply network; and
generating in said solenoid a second current signal exclusively as a result of residual magnetism in said magnetic element;
said second current signal is activated when said mobile open/close element is still in said second position; and
wherein said first current signal, after reaching a first current level for moving said open/close element from said first position to said second position, does maintain a second current level for holding said open/close element in said second position, and wherein said second current signal has reached at least a level equal to 40% of said second current level before said open/close element starts moving from said second position towards said first position.

10. The method according to claim 9, wherein said second current signal is maintained at least until said open/close element has reached said first position.

11. The method according to claim 9, which, before generating said second signal, includes interruption of passage of current respectively between said supply node and said solenoid and between said solenoid and said ground node.

12. The method according to claim 11, wherein said step of interruption of passage of current has a duration equal to or shorter than 200 μs.

* * * * *